Figure 1:
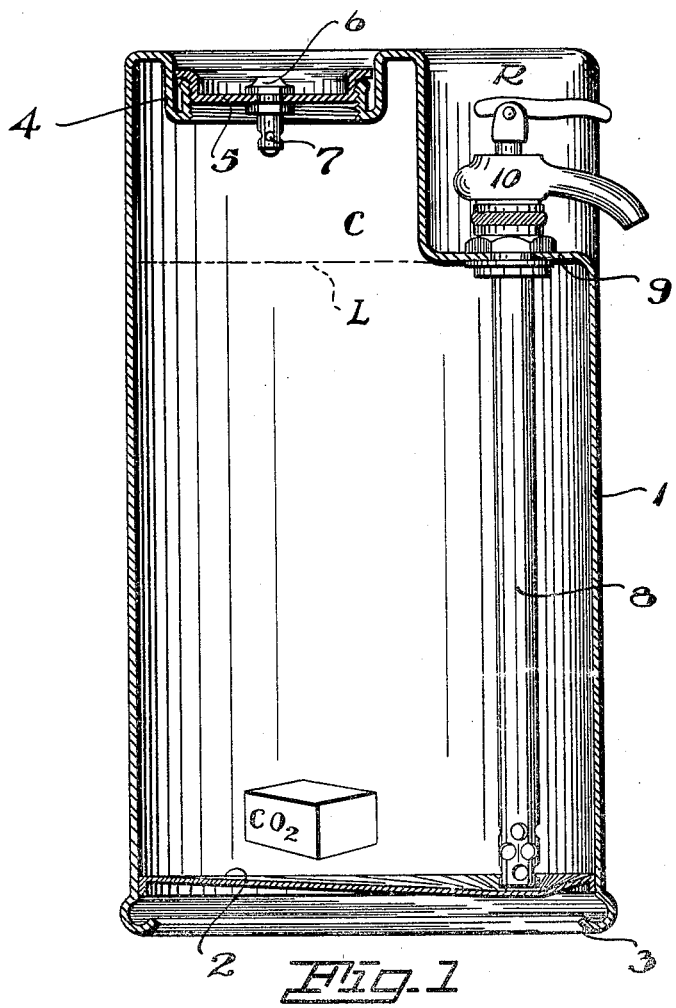

May 2, 1933. F. N. MARTIN 1,907,301
SHIPPING AND DISPENSING FOUNTAIN

Filed Oct. 23, 1931

Fred N. Martin
Inventor

By Herbert E. Smith
Attorney

Patented May 2, 1933

1,907,301

UNITED STATES PATENT OFFICE

FRED N. MARTIN, OF PORTLAND, OREGON

SHIPPING AND DISPENSING FOUNTAIN

Application filed October 23, 1931. Serial No. 570,682.

My present invention relates to improvements in shipping and dispensing fountains for transporting and dispensing various liquids, especially natural fruit juices, carbonated beverages and other beverages known as fountain drinks and dispensed from apparatus of the soda-water fountain type.

The primary object of the invention is to preserve and refrigerate the beverage, in its container, not only while the container or fountain is in transit, but also after the fountain or container has reached its destination and while the beverage is being dispensed. The containers or cans in which the beverage or liquid is shipped may be of various sizes, and the use of these containers or fountains is not limited to places where carbonated drinks are dispensed to the public, as it will be apparent that the fountains may be employed for home use.

As is well known, beverages are carbonated, or charged with carbon dioxid gas, and it is the custom to supply a separate source of carbon dioxid gas for charging the beverage. This custom requires handling of the beverages in one container, and also requires the handling of the gas in another container, after which, for purposes of dispensing, the gas is introduced to the beverage. According to the existing practices, time, expense, and labor are required not only in the shipment of the separated beverage and gas, but also in carbonating the beverage and dispensing the carbonated beverage.

In carrying out my invention I utilize solid carbon dioxid, either in crushed or bulk form, depending upon the requirements, which is placed in the container or combined shipping and dispensing fountain, prior to the operation of filling the container with the liquid beverage. The quantity of the solid carbon dioxid used in a container is predetermined by the quantity of liquid or beverage to be carbonated.

The length of time during which the beverage is to be preserved and refrigerated, as well as the approximate time required in dispensing the beverage, are also factors in determining the quantity of carbon dioxid, in solid form, to be used.

The invention consists essentially in refrigerating and preserving liquids in a transporting and dispensing container, through the novel steps of depositing a quantity of solid carbon dioxid in the interior of the container, filling the container to a level whereby the liquid will provide a chamber or space in the upper part of the container for carbon dioxid gas, evaporated from the solid carbon dioxid. The carbon dioxid gas evaporated from the solid carbon dioxid permeates the beverage, expels the air contained in the beverage, and substitutes therefor a pressure in the container or fountain by means of which the beverage may be dispensed.

In this manner a sterile, expansive gas is provided in the liquid and container or fountain, and the charged or carbonated beverage is refrigerated and preserved.

In the accompanying drawing I have illustrated one exemplification of my invention where a sealed container is shown having filling, venting, and dispensing means, but it will be understood that the combined tank and fountain may be varied and altered in size, shape and construction for various purposes, without departing from the principles of my invention.

The cylindrical tank or container 1 is provided with a dished bottom 2, which is inset and fashioned with an annular bottom flange 3 for the protection of the bottom.

In the top of the tank the filling opening is fashioned with an inset neck and threaded nipple 4, and the countersunk, flanged, sealing closure or lid 5 is employed to form a gas tight and liquid tight joint, closing the interior of the tank. The closure or lid is provided with a vent nipple 6 opening exterior of the lid, and under the lid, within the upper portion of the tank, this nipple is provided with a venting valve 7.

An outlet pipe 8 for the beverage is supported in the horizontal wall 9 of a depression in the walls of the tank, and a swiveled faucet or dispensing valve-device 10 is connected to the outlet pipe exterior of the tank, for dispensing the contents of the tank.

The swiveled faucet or dispensing valve 10 may be turned into the recess R while the tank is in transit or being shipped, or stored, but is swung out to the position indicated when the beverage is to be dispensed.

With the closure or lid removed, and before the beverage is poured into the tank, a quantity of carbon dioxid, in solid form, either crushed, or in a cube as indicated at $CO_2$, is deposited within the tank, resting on the bottom thereof, after which the beverage is poured into the tank in suitable manner, until the liquid level reaches approximately the dotted line L in the drawing, about on a line with the horizontal wall 9 of the exterior depression or recess R. Above the liquid level a chamber C is formed for carbon dioxid gas, under pressure, to be utilized in forcing the beverage up through the ported outlet pipe 8.

After filling to the desired level the closure or lid is placed in position to seal the tank against escape of liquid or gas, and of course the faucet or valve-device 10 also closes the outlet pipe 8 against escape of gas and liquid from the interior of the tank, unless the faucet is opened, and then, only the liquid is forced out of the tank.

After the tank has been filled as indicated, and closed, a quantity of carbon dioxid gas is introduced to the chamber C, through the nipple 6 and automatic check valve device 7, under pressure, as an auxiliary agency, for augmenting the interior pressure to force the carbonated beverage through pipe 8 when the faucet 10 is opened.

By evaporation or melting of the chunk of carbon dioxid, which is surrounded by the liquid in the container, carbon dioxid gas is caused to permeate and expand through the liquid contents of the tank, forcing the air content from the liquid into the gas chamber C from which the air is expelled through the vent 6—7.

The carbon dioxid gas is heavier than the air, and consequently remains under or beneath the air, and due to expansion of the gas, the air is practically eliminated from the contents of the tank and from the gas chamber.

The evaporation of the solid carbon dioxid into carbon dioxid gas carbonates the liquid, sterilizes and purifies the liquid, and creates within the tank sufficient pressure to eject the contents therefrom through the faucet when the latter is manipulated in usual manner for that purpose.

Inasmuch as the solid carbon dioxid has a temperature of approximately 112 degrees below zero, it will be apparent that the confined contents of the tank will be refrigerated as well as purified and carbonated, and the low degree of temperature of the liquid will be maintained as long as is required for practical uses.

Thus, as one example of the practical value and use of my invention, the tank 1 may be supplied, at a central station, with the beverage and its required quantity of solid carbon dioxid, and then shipped or delivered to the retail sales station, as for instance a soft drink establishment, drug-store, or other similar place, and by use of the faucet 10 the carbonated, refrigerated, and purified beverage may be dispensed with facility.

By thus carrying out my invention it will be apparent that much time, labor and expense are saved; a single container for both the beverage and the carbon dioxid gas is employed in lieu of the two containers (one for the beverage and one for the carbon dioxid gas) now customarily employed; and the manipulation of the single faucet 10 is required for dispensing the carbonated beverage, instead of utilizing first a faucet for the beverage and then a valve-device or injector for injecting the carbon dioxid gas into the beverage, as is now the customary practice.

After the contents has been dispensed from the tank, the empty tank is returned to the central filling station, its separable parts are removed and cleansed, after which the combined shipping and dispensing tank is again ready for use.

Different varieties of liquids are of course shipped in the tanks, and different quantities of liquids are shipped in tanks having different capacities, and of course the carbonated liquid may be dispensed in quantities as desired by the use of the faucet 10.

Having thus fully described my invention, what I claim as new, and desire to secure by Letters Patent is:—

1. The process of shipping and dispensing a liquid which consists in depositing a quantity of solid carbon dioxid in a combined shipping and dispensing tank, filling the tank with the liquid to the desired level to form a gas chamber, introducing carbon dioxid gas to said chamber, and permitting the solid carbon dioxid to evaporate and form carbon dioxid gas for co-action with the first mentioned supply of carbon dioxid gas in placing the liquid under pressure for dispensing purposes.

2. A sealed container having filling, venting, and dispensing means, a quantity of solid carbon dioxid in the container, a liquid content in the container forming a gas chamber in a portion of the container, and means independent of the solid carbon dioxid for injecting a quantity of carbon dioxid gas to said chamber.

3. A self-contained, sealed, shipping fountain for a liquid under pressure, having filling and dispensing means, a liquid content in the container forming a gas chamber in the upper portion of the container, an automatically-operating pressure-actuated valve for venting said chamber to the atmosphere, and a quantity of solid carbon dioxid in the container.

In testimony whereof I affix my signature.

FRED N. MARTIN.